United States Patent [19]

Hirano et al.

[11] Patent Number: 4,702,964
[45] Date of Patent: Oct. 27, 1987

[54] FIXING ROLL

[75] Inventors: Yasuo Hirano; Kazuo Nojima, both of Numazu, Japan

[73] Assignee: Ricoh Co., Ltd., Tokyo, Japan

[21] Appl. No.: 754,792

[22] Filed: Jul. 12, 1985

[30] Foreign Application Priority Data

| Jul. 18, 1984 | [JP] | Japan | 59-149197 |
| Jul. 30, 1984 | [JP] | Japan | 59-157255 |
| Jul. 31, 1984 | [JP] | Japan | 59-160363 |
| Dec. 3, 1984 | [JP] | Japan | 59-256202 |

[51] Int. Cl.⁴ .............................................. B32B 9/04
[52] U.S. Cl. .................................. 428/447; 428/450; 430/110; 430/111
[58] Field of Search ............... 428/447, 450; 430/110, 430/111

[56] References Cited

U.S. PATENT DOCUMENTS

| 3,603,086 | 7/1986 | Fujii et al. | 428/447 |
| 4,074,001 | 2/1978 | Imai et al. | 430/99 |
| 4,360,566 | 11/1982 | Shimizu et al. | 428/404 |
| 4,518,655 | 5/1985 | Henry et al. | 428/447 |
| 4,533,617 | 8/1985 | Inoue et al. | 430/111 |
| 4,568,625 | 2/1986 | Uchiyama et al. | 430/110 |
| 4,588,645 | 5/1986 | Ogawa et al. | 428/447 |
| 4,603,087 | 7/1986 | Ema et al. | 428/447 |

FOREIGN PATENT DOCUMENTS 1313185 4/1973 United Kingdom .

OTHER PUBLICATIONS

Xerox Disclosure Journal, vol. 5, No. 5, Sep.–Oct., 1980, pp. 493–494.

Primary Examiner—Edith Buffalow
Attorney, Agent, or Firm—Flynn, Thiel, Boutell & Tanis

[57] ABSTRACT

A fixing roll characterized by crosslinking its surface with a rubber compound consisting essentially of a methyl vinyl system silicone raw rubber and silica and forming thereon a silicone rubber layer having a crosslinking density of $1 \times 10^{-4} \sim 8 \times 10^{-4}$.

20 Claims, 7 Drawing Figures

FIXING ROLL

BACKGROUND OF THE INVENTION

1. Field of the Invention

The present invention relates to a fixing roll consisting essentially of silicone rubber for use in an electrostatic photography process and the like.

2. Description of the Prior Art

In the electrostatic photography processes such as electrophotography and the like, an image can generally be obtained by the steps of forming a toner image on an image supporting means such as paper or the like by virtue of transfer or development and fixing this toner on said image supporting means by heating or pressure. As this fixing means, there has been used a fixing silicone rubber roll. However, the usual fixing roll is limited in durability, for instance, about 60,000--about 80,000 pieces when actually set in an electrophotographic copying machine. In view of this, development of a fixing roll which is more superior in durability has been expected.

SUMMARY OF THE INVENTION

The primary object of the present invention is to provide a fixing roll of greatly improved durability. The secondary object of the present invention is to provide a fixing roll usable in both a press-fixing system and heat-fixing system, and further usable in a fixing means using these two systems at the same time.

The fixing roll according to the present invention is characterized in that (1) its surface is crosslinked with a rubber compound consisting essentially of a methyl vinyl system silicone raw rubber and silica to thereby form a coated layer having a crosslinking density of $1 \times 10^{-4} \sim 8 \times 10^{-4}$ mole/cc thereon, wherein (a) at the time of crosslinking, said rubber compound is incorporated with magnesium hydroxide or a highly or relatively highly-active magnesium oxide or (b) the crosslinking density of said crosslinked polymer aline is $2 \times 10^{-4}$ mole/cc or more; and (2) its thermal conductive elastic body is crosslinked with a rubber compound consisting essentially of methyl vinyl system silicone raw rubber and silica to form a coated layer having a crosslinking density of $6 \times 10^{-4}$ mole/cc or more thereon.

The methyl vinyl system silicone raw rubber has the polysiloxane structure represented by wherein the crosslinking density can be controlled by changing the ratio of m to n, namely by changing the percentage of vinyl group. Further, crosslinkage can be formed between silica and siloxane polymer.

That is, in the silicone rubber there exists both the crosslinkage of the polymer (c-1) formed between polymer and polymer by the vinyl group and the crosslinkage (c-2) formed between silica and polymer by silica.

The crosslinking density of the polymer alone (namely, the crosslinking density of c-1) can be measured by the ammonia atmosphere toluene swelling method and the total crosslinking density including said both crosslinking density (namely, the crosslinking density including c-1 and c-2) can be measured by the toluene swelling method respectively.

The "crosslinking density" referred to in the specification and claims, unless defined specifically, includes both the crosslinkage formed by the vinyl group mentioned above and the crosslinkage formed between silica and the polymer. In other words, the crosslinking density denotes the number of crosslinks contained per 1 cc of a crosslinked silicone rubber. This crosslinking density is measured by the toluene swelling method referred to afterwards.

In this connection, it is to be noted that the "methyl vinyl system silicone raw rubber" referred to above and afterwards means a silicone raw rubber having a methyl group and a vinyl group.

BRIEF DESCRIPTION OF THE DRAWING

FIGS. 6 and 7 are graphs relating to the fixing roll of the type shown in FIG. 2, wherein

DETAILED DESCRIPTION OF THE PREFERRED EMBODIMENTS

As the modes of the fixing roll according to the present invention there may be enumerated (i), (ii), (iii) and (iv) as follows:

(i) a fixing roll having a silicone rubber-coated surface, characterized by that said silicone rubber contains magnesium hydroxide therein;

(ii) a fixing roll having a silicone rubber-coated surface, characterized by that said silicone rubber contains a highly-active magnesium oxide (including a relatively highly-active magnesium oxide; this is applicable to the following) therein;

(iii) a fixing roll having a silicone rubber-coated surface, characterized by said surface being crosslinked with a rubber compound consisting essentially of a methyl vinyl system silicone raw rubber and silica and is thus formed thereon a coated layer having a crosslinking density of the polymer alone (namely, the crosslinking density of c-1) $2 \times 10^{-4}$ mole/cc or more; and (iv) a fixing roll having a silicone rubber-coated thermal conductive elastic body layer, characterized by that said roll surface is crosslinked with a rubber compound consisting essentially of a methyl vinyl system silicone raw rubber and silica and is thus formed thereon a coated layer having a crosslinking density of $6 \times 10^{-4}$ mole/cc or more.

It is as already stated that also in the preceding (i) and (ii), a silicone rubber-coated layer is formed by using a rubber compound consisting essentially of a methyl vinyl system silicone raw rubber and silica and adding thereto magnesium hydroxide or a highly-active magnesium oxide for crosslinking.

The fixing roll according to the present invention is designed to have the specific structure as mentioned above so as to achieve a powerful durability, and especially this effect is conspicuous in the thermal fixing roll used in the manner of supplying a polysiloxane system oil onto the roll surface as a mold release agent (releasing agent). The "polysiloxane system oil" referred to herein and afterwards means an oil containing a siloxane bond in the compound.

Silicone oil is supplied continuously onto the roll surface as a mold release agent in order to prevent the occurrence of toner offset, but the inventors of this application have found that swelling of the rubber exposed to this oil constitutes a powerful reason for the deterioration of the rubber roll.

That is, the rubber swelled by the oil deteriorates in mechanical strength and weakens against external force. At the same time, the impregnated oil itself creates an internal stress in the rubber to thereby accelerating deterioration. Still further, the oil acts as the carrier for conveying a deterioration-promoting substance into an image supporting means such as toner, paper or the like.

The usual rubber roll is severely deteriorated in durability because its initial degree of swelling is large and further the increasing percentage of the degree of swelling becomes large as the rubber roll is used.

In view of this, the inventors of this application have carried out various experiments for the purpose of improving the durability of silicone rubber. As one of those experiments, the inventors have investigated the relation between the durability of common silicone rubber and the cross-linking density to thereby obtain the results as shown in FIG. 3, wherein the durability of rubber is indicated by the number of durably copied sheets.

Figure 3:
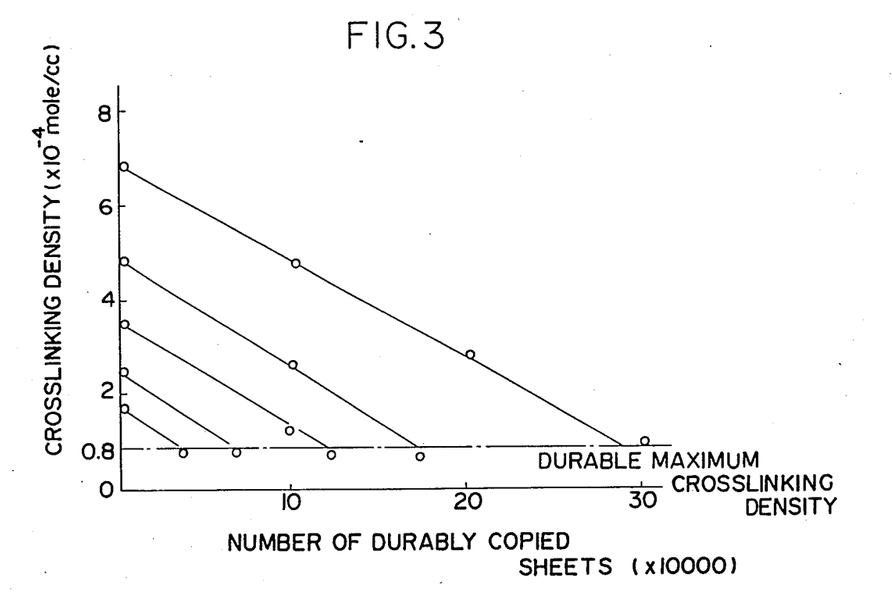
FIG. 3 is a graph showing the relation between the crosslinking density of one embodiment of silicone rubber used in the thermal fixing roll and the durable maximum crosslinking density at the time of fixing or the number of durably copied sheets.

It can be seen from FIG. 3 that when the crosslinking density of rubber lowers to about $0.8 \times 10^{-4}$ mole/cc, it is unfit for practical use. This is because the tear strength and the tensile strength decrease due to the swelling of rubber. Also the abrasion resistance deteriorates. In order to enhance the durability, accordingly, it is necessary to maintain the initial crosslinking density of rubber (the number of crosslinkage contained per/cc of a rubber just after completion of crosslinkage) as high as possible. However, when the crosslinking density becomes too high, there are caused problems that the hardness of rubber becomes high, the flexibility of rubber deteriorates and accordingly its fixability also deteriorates, and further the workability of the roll deteriorates.

Nevertheless, the inventors have ascertained that addition of magnesium hydroxide or a highly-active magnesium oxide in silicone rubber can markedly reduce the rate at which the crosslinking density decreases even when the initial crosslinking density is relatively low, and can widely increase the number of durably copied sheets irrespective of the use or non use of a releasing agent.

In the preceding (i) and (ii), accordingly, the silicone rubber forming the coated layer is made by further adding magnesium hydroxide or a highly-active magnesium oxide to the rubber compound containing the methyl vinyl system silicone raw rubber having the polysiloxane structure represented by the aforesaid formula and silica and crosslinking same.

The suitable amount of silica compounded is about $30 \sim 60$ wt %. Silica may be either wet silica (precipitated silica) or dry silica (aerosol silica). However, the wet silica is more preferable in the point of releasing property against the toner.

The suitable initial crosslinking density of silicone rubber is about $1.5 \times 10^{-4} \sim 2.5 \times 10^{-4}$ mole/cc, but may be about $1 \times 10^{-4} \sim 8 \times 10^{-4}$ mole/cc.

The crosslinking density can be adjusted by properly selecting not only the amount of the vinyl group contained in the material raw rubber but the compounding amount or the surface activity of silica in the case of the rubber compound. The silicone rubber may be added with a crosslinking agent, or an inorganic filler as occasion demands, in addition to aforesaid components.

As the crosslinking agent, there can be typically enumerated 2,5-dimethyl-2,5 di(tertiary butyl peroxy) hexane and dicumyl peroxide.

As the inorganic filler, there can be used powders of diatomaceous earth, quartz, iron oxide, zinc oxide, titanium oxide, calcium oxide, magnesium oxide, talc, aluminum silicate, aluminum oxide and the like; fibers of carbon black, potassium titanate, asbestos, glass, carbon and the like; and powders of Teflon, boron nitride and the like. Among them, the diatomaceous earth is most preferable. These fillers have little influence upon the crosslinking density and can control the degree of hardness of silicone rubber or the degree of swelling of oil.

In the case of the fixing roll disclosed in the above mentioned embodiment (i) of the present invention, the magnesium hydroxide added to the silicone rubber, even when added in a small amount can markedly the reduce the rate of decrease of the crosslinking density of the silicone rubber, but addition of magnesium hydroxide in too great an amount is not preferable because it deteriorates the releasing property of the silicone rubber (namely, it becomes necessary to coat the silicone rubber with a larger amount of the releasing agent, such as silicone oil, than is usual). In view of this, the amount of magnesium hydroxide added is determined to be $1.4 \sim 10.0$ parts by weight, preferably $1.4 \sim 5.0$ parts by weight per 100 parts by weight of the methyl vinyl system silicone raw rubber.

Referring to the differences of magnesium hydroxide depending on its kinds, the greater the iodine adsorption amount (activity value), the more effective for improving the durability.

In the case of the fixing roll disclosed in the above mentioned embodiment (ii) of the present invention, the "highly-active magnesium oxide" is incorporated in the silicone rubber. This highly-active magnesium oxide comprises porous magnesium oxide fine powders, and its activity value (iodine adsorption amount) is in the range of $70 \sim 170^{Img}$/MgO that is very high physically and chemically. The normal magnesium oxide has a low activity value (iodine adsorption amount) of $30 \sim 50^{Img}$/MgO.

The amount of the highly-active magnesium oxide added to the silicone rubber is 0.3~14.0 parts by weight, preferably 0.3~7.0 parts by weight per 100 parts by weight of the methyl vinyl system silicone raw rubber.

Next, explanation will be added to the fixing roll disclosed in the above mentioned embodiment (iii) of the present invention. This embodiment is designed to obtain a high durability by maintaining the cross-linking density of the polymer alone crosslinked by the vinyl group in the range of $2 \times 10^{-4}$ mole/cc or more, preferably in the range of $2 \times 10^{-4} \sim 5 \times 10^{-4}$ mole/cc When the crosslinking density of the polymer alone crosslinked by the vinyl group is $5 \times 10^{-4}$ mole/cc or more, the flexibility decreases and the rubber elasticity is lost, whereby the fixing roll undergoes crocks when grinding and the quality of the fixed image deteriorates.

When the crosslinking density of the polymer alone crosslinked by the vinyl group is determined as aforesaid, the mechanical strength increases, and further the decomposition velocity of the polymer caused by a deterioration-promoting substance is retarded. This is considered to contribute toward improvement of the durability.

In the fixing roll disclosed in the embodiment (iii), the suitable amount of silica compounded is in the range of 20~50 wt %. It is just the same as the fixing rolls disclosed in the embodiments (i) and (ii) that another inorganic filler but silica, a heat stabilizing agent, a processing aid and the like may be added as occasion demands.

Figure 1:
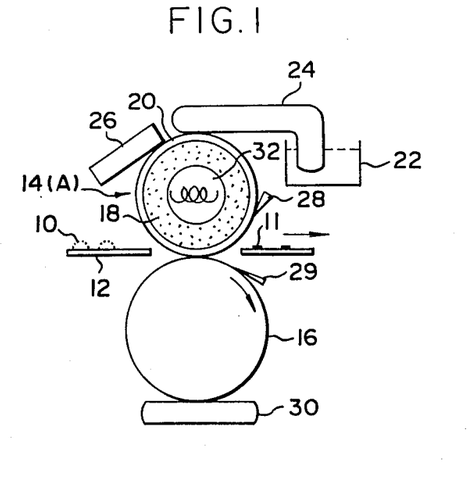
FIG. 1 is a schematic view showing one embodiment of the fixing apparatus using the fixing roll according to the present invention.

The fixing rolls disclosed in these embodiments (i), (ii) and (iii) may be prepared as shown in FIG. 1, namely by applying a primer point on a core rod (core bar-roll) and drying; thereafter winding a silicone rubber raw material containing magnesium hydroxide or a highly-active magnesium oxide around said core rod or winding a silicone rubber raw material consisting essentially of a methyl vinyl system silicone raw rubber that holds the crosslinking density of the polymer alone in a specific range on crosslinking and silica round the core rod; and then crosslinking and curing (vulcanizing) the same.

Figure 2:
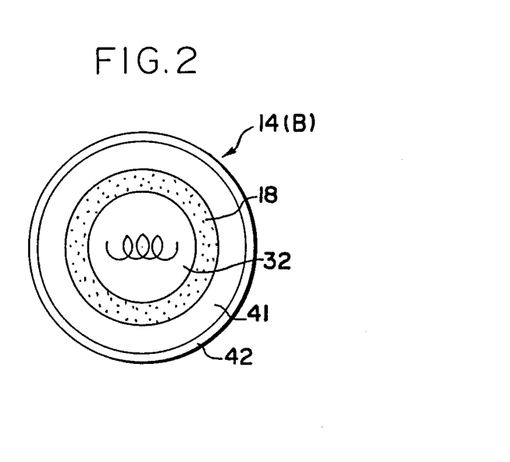
FIG. 2 is a view showing the fixing roller according to the present invention that is somewhat different structurally from the roll shown in FIG. 1 and comprises providing a non-adhesive silicon coated layer on a thermal conductive elastic body layer.

This silicone rubber layer (coated layer) may be formed directly on the core rod, and further may be formed on the thermal conductive elastic body layer secured and formed on the core rod for instance as shown in FIG. 2.

Next, the fixing roll disclosed in the embodiment (iv) will be explained with reference to FIG. 2. This fixing roll 14(B) comprises forming, on a core rod 18, a highly-thermally conductive, relatively thick silicone rubber layer (thermal conductive elastic layer )41, and further forming, on its outer periphery, a relatively thin silicone rubber layer 42 having a crosslinking density of $6 \times 10^{-4}$ mole/cc or more.

As the highly-thermally conductive silicone rubber constituting the thermal conductive elastic layer 41 there may be suitably used the one prepared by adding a thermal conductivity increasing agent to an elastomer such, for instance, as a thermo-setting type silicone rubber, a room temperature-setting type silicone or the like. As the thermal conductivity increasing agent there may be used powders of graphite, metal, iron oxide, zinc oxide, boron nitride and the like. These may be used singly or in a concurrent combination of two kinds or more.

The suitable content of the thermal conductivity increasing agent added is 20~250 parts by weight, preferably 60~100 parts by weight per 100 parts by weight of said elastomer. When said content is less than 20 parts by weight it almost never contributes to improvement of the thermal conductivity of the rubber material. When said content is more than 250 parts by weight, contrarily, workability deteriorates extremely on blending and makes the rubber material brittle and further, when the core rod is coated with the silicone rubber layer 42 the elasticity deteriorates, whereby the fixing roll becomes unfit for practical use.

Referring to the hardness and thickness of the elastomer in the silicone rubber layer 42, the suitable hardness is 20~60 according to JIS K-6301, (Japanese Industrial Standard K-6301), considering that a suitable amount of cavities may be formed when the fixing roll 14(B) is pressed against a pressure roll 16 opposite thereto, and the suitable thickness is about 3~6 mm, considering that rising of the surface temperature of the fixing roll 14(B) may not be retarded and the like.

A silicone rubber layer 42 forming the surface layer (coated layer) as referred to previously, has said total crosslinking density of $6 \times 10^{-4}$ mole/cc or more, preferably $6 \times 10^{-4} \sim 8 \times 10^{-4}$ mole/cc. Accordingly, the silica contained in the rubber compound is regulated so as to have a crosslinking density in the range of $6 \times 10^{-4}$ mole/cc or more, actually in the range of 30~60 wt %.

The fixing roll 14(B) disclosed in this embodiment (iv) may be prepared in the manner of forming a thermal conductive elastic body layer 41 on an aluminum made core rod 18 by crosslinking a thermosetting type silicone rubber compound containing for instance graphite powder; thereafter grinding its surface so as to have a proper thickness; and then winding a rubber compound containing a methyl vinyl system silicone raw rubber and a filler (preferably, silica) around the outer periphery of said roll (namely, layer 41) and crosslinking to thereby form a coated layer 42.

Needless to say, the fixing roller disclosed in this embodiment (iv) may compound various additives in the rubber compound as occasion demands.

The fixing roll according to the present invention explained by means of the above 4 embodiments, as will be clarified by Examples referred to afterwards, has a superior durability. Because of this, the fixing roll according to the present invention is sufficiently applicable to not only the fixing method wherein an offset-preventing liquid such as silicone oil or the like is supplied on fixing but also the fixing method free from supply of such a liquid. Further, the fixing roll according to the present invention is effectively used in the press heating method, but can be used in the pressure fixing method.

Next, the fixing roll according to the present invention will be explained with reference to FIG. 1.

An image supporting means 12 such as paper or the like on which an image is formed using a toner 10 passes through between a fixing roll 14 and a pressure roll 16, and said toner 10 is heated by said fixing roll 14(A) and fixed on said image supporting means 12, whereby an image 11 is formed. The fixing roll 14(A) is provided, on its core bar-roll 18, with a silicone rubber layer 20 having a property specified by the present invention.

A releasing agent is conveyed from a releasing agent tank 22 onto the surface of the fixing roll 14 by means of a release agent-coated felt 24, and the coated amount is controlled by a blade 26. Reference numerals 28, 29 each denotes a separating blade, 30 denotes a cleaning material and 32 denotes a heater.

In the thermal fixing apparatus as aforesaid, a part of the fixing roll is designed to always cave in the coated layer of the fixing roll, and therefore it is difficult for the image supporting means (copying paper) to be wound around the fixing roll, in other words, such a phenomenon that the toner holding surface of the copying paper is wound around the fixing roll is difficult to take place.

When the rubber layer of the fixing roll is so much thickened, the occurrence of said winding round is so much suppressed. On the other hand, however, the heat response property of the fixing roll is made worse because rubber is poor in heat response property. When the rubber layer of the fixing roll is thinned, the heat response property is improved, but the contact width (nip width) decreases to loose the fixability. When the rubber hardness is lowered and thus the rubber layer of the fixing roll is softened, the fixability is surely improved, but there is also brought about such a disadvantage that when a nail for separating a copying paper (a separating nail) is used said nail is caught in the rubber layer for damaging the fixing roll.

The fixing roll whose durability has been improved without bringing about the disadvantage like this is shown in FIG. 2.

EXAMPLES

Parts referred to herein are all parts by weight.

EXAMPLE 1

Prior to the preparation of a thermal fixing roll, a core rod and a non-adhesive silicone rubber composition were prepared as follows.

Core bar-roll

The surface of an aluminum roll (outer diameter: 39.4 mm$\phi$) was roughened using a sand blast, and said surface was coated with a primer (XP22 - 002 produced by TOSHIBA SILICONE K.K.) and air dried, thereby providing a several $\mu$m-thick primer layer thereon.

Silicone rubber composition

| | |
|---|---|
| silicone rubber compound*[1] (DY32-173Bu produced by TORE SILICONE K. K.) | 100 parts |
| coloring paste*[2] (CP-21 produced by TORE SILICONE K. K.) | 1 part |
| crosslinking agent*[3] (RC-4 produced by TORE SILICONE K. K.) | 1 part |

*[1]Silicone rubber compound (polymer content: 70 wt %) of peroxide crosslinking type consisting essentially of methyl vinyl polysiloxane and silicon dioxide
*[2]A mixture consisting essentially of red iron oxide powder and organopolysiloxane
*[3]A mixture consisting essentially of 2,5-dimethyl-2,5-di(t-butyl peroxy)hexane, organopolysiloxane and an inorganic filler The aforesaid mixtures were mixed with two kinds of magnesium hydroxide shown in Table 1 each in amounts of 0, 1, 2, 5, 10 and 20 parts, thereby preparing 11 kinds of silicone rubber compositions.

TABLE 1

| Characteristic | Magnesium hydroxide | |
|---|---|---|
| | KYOWASUIMAG F (produced by KYOWA KAGAKU KOGYO K. K.) | KYOWASUIMAG (produced by KYOWA KAGAKU KOGYO K. K.) |
| Mg(OH)$_2$ content (after drying) | 96.1% | 97.8% |
| Iodine adsorption amount (activity value) | 70 iodine mg/g | 20 iodine mg/g |

Next, an about 2 mm thick-sheet was prepared from each of these 11 kinds of compositions by means of two rolls. This sheet was wound round said core rod and vulcanized under the following conditions. Thereafter, same was finished by a grinder so as to have a roll outer diameter of about 40 mm.

Pressure; 120 Kg/cm$^2$
Pressing temperature; 170° C.
Pressing time; 10 minutes
Secondary vulcanizing temperature; 200° C.
Secondary vulcanizing time; 4 hours Thus prepared thermal fixing rolls were subjected to the paper supplying test by means of the durability testing method (I) referred to afterwards. The obtained results are shown in Table 2.

TABLE 2

| | Amount of Mg(OH)$_2$ ( ) indicates values against polymer 100 | Initial crosslinking density ($\times 10^{-4}$ mole/cc) | Number of durably copied sheets (ten thousand sheets) | Crosslinking density of rubber deteriorated in the left tests ($\times 10^{-4}$ mole/cc) |
|---|---|---|---|---|
| Comparative Example | 0 part (0 part) | 1.50 | 2.9 | 0.8 |
| KYOWA SUIMAG F | 1 (1.4) | 1.49 | 30.0 | 0.7 |
| | 2 (2.9) | 1.48 | 50.0 | 0.8 |
| | 5 (7.1) | 1.60 | 54.0 | 0.7 |
| | 10 (14.3) | 1.72 | 55.0 | 0.8 |
| | 20 (28.6) | 1.69 | 54.0 | 0.8 |
| KYOWA SUIMAG | 1 (1.4) | 1.47 | 32.5 | 0.8 |
| | 2 (2.9) | 1.50 | 45.0 | 0.8 |
| | 5 (7.1) | 1.60 | 47.0 | 0.7 |
| | 10 (14.3) | 1.62 | 48.0 | 0.7 |
| | 20 (28.6) | 1.72 | 48.0 | 0.7 |

It can be seen from Table 2 that addition of magnesium hydroxide markedly slows deterioration of silicon rubber, and even when a small amount of magnesium hydroxide the number of durably copied sheets conspicuously increases. When magnesium hydroxide is added in an amount exceeding 10 parts against the raw rubber (14.3 parts per 100 parts of the polymer) the effect resulting from addition of magnesium hydroxide is not so much improved.

Measurement of the crosslinking density by means of the toluene swelling method The crosslinking density was measured by the method disclosed in R. B. PRIME, Thermochimica Acta 26 (1978), 166–174 and "Application and development of silicone rubber", Polymer Digest 8 (1980), P 59–60.

That is, a sample of 5 mm×20 mm was cut off from a 2 mm-thick vulcanization molded rubber sheet and dipped in 50 ml of toluene at room temperature. And, the weight of the toluene-containing sample was measured every proper time. The weight of the sample, where the difference between two values measured at intervals of 24 hours became 1% or less of the weight of the sample, was named W(g).

Next, this sample was air-dried and thereafter was dried at 120° C. for 3 hours to remove toluene. Then, the weight Wo(g) was measured. This sample was placed on a platinum boat, heated to 900° C. at the heating speed of 10° C./minute or less in a current of nitrogen, held at 900° C. for 10 minutes, and thereafter cooled, whereby the weight Wf(g) of the remaining sample was measured.

The number of crosslinks No/Vo (mole/cc) contained per 1 cc of the vulcanized rubber was found out using the above values by the following formula and made the crosslinking density.

$$No/Vo = \frac{-[\ln(1 - V_2) + V_2 + 0.465 V_2^2]}{106.27 \times (V_2^{\frac{1}{3}} - V_2/2)}$$

wherein, $$V_2 = \frac{\left(\frac{Wo - Wf}{Wo}\right)/0.98}{\left(\frac{Wo - Wf}{Wo}\right)/0.98 + \left(\frac{W - Wo}{Wo}\right)/0.867}$$

Method for measuring the iodine adsorption amount 1 g of the sample is precisely weighed. This is placed in a 50 ml-color comparison tube. This tube is added with 50 ml of 0.1N iodine reagent solution (which denotes a carbon tetrachloride solution of iodine having a titer of 0.975~1.025) and sealed up tightly. This tube is shaken for precisely 30 minutes by means of a shaker and left standing for 10 minutes. Thereafter, 10 ml of the supernatant liquid is taken out by means of a transfer pipet, put in a 200 ml-beaker containing 25 ml of a 0.03N iodine potash solution (75% alcohol solution), and titrated using a 0.05N sodium thiosulfate solution. This titration is effected until the brown of iodine fades away. At the same time, the blank test is also effected. This blank test comprises adding 10 ml of the 0.1N iodine reagent solution to a beaker containing 25 ml of the 0.03N iodine potash solution and titrating the same using the 0.05N sodium thiosulfate solution. (Calculating method)

$$\text{Iodine absorption amount (Img/MgO g)} = (V_2 - V_1)\frac{127 \times N_1}{0.2}$$

$V_1$: Number of ml of the 0.05N sodium thiosulfate solution required per 10 ml of the reagent solution
$V_2$: Number of ml of the 0.05N sodium thiosulfate solution required for the blank test
$N_1$: Normality of the $Na_2S_2O_3$ solution $(0.05 \times F)$

Method for valuing the durability (I)

A roll, which comprises coating the surface of a hollow aluminum core rod having an outside diameter of 40 mm with silicone rubber so as to have a thickness of 0.5 mm, was employed as a fixing roll, and copying was carried out continuously by means of the apparatus shown in FIG. 1. A twill-figured image, wherein 8% of the total area of said image was black, was continuously formed on B4-sized papers by longitudinal feed (15 sheets/minute) by using polydimethylsiloxane as the mold release agent and under the conditions: the linear velocity of the fixing roll 115 mm/second and the surface temperature of the fixing roll 180±3° C., and the time when at least one of the non-fixed portion caused by the fixing roll, offset and unbalanced luster of the solid area came into existence was made the limit of durability.

EXAMPLE 2

| | |
|---|---|
| A methyl vinyl system silicone raw rubber (pulverized with a vinyl group alone and having the crosslinking density of $2 \times 10^{-4}$ mole/cc) | 55 parts |
| A wet silica (Sipernat D17 produced by Degusa AG Inc. in West Germany) | 36 parts |
| Diatom earth (Radiolite #200 produced by SHOWA KAGAKU K. K.) | 15 parts |
| A coloring paste (the same as used in Example 1) | 1 part |
| A crosslinking agent (the same as used in Example 1) | 1 part |

A silicone rubber compound consisted of the above mentioned components was added and mixed with KYOWA SUIMAG F and KYOWA SUIMAG, both being the magnesium hydroxide used in Example 1, each in amounts of 0, 1, 2, 5, 10 and 20 parts, thereby preparing 11 kinds of silicone rubber compositions. Thermal fixing rolls were prepared using these respective compositions according to the same procedure as Example 1. These thermal fixing rolls were subjected to the durability test according to the same procedure as Example 1.

The obtained results are shown in Table 3.

TABLE 3

| | Amount of Mg(OH)$_2$ ( ) indicates values against polymer 100 | Initial crosslinking density ($\times 10^{-4}$ mole/cc) | Number of durably copied sheets (ten thousand sheets) | Crosslinking density of rubber deteriorated in the left tests ($\times 10^{-4}$ mole/cc) |
|---|---|---|---|---|
| Comparative Example | 0 part (0 part) | 7.0 | 7.5 | 0.7 |
| KYOWA SUIMAG F | 1 (1.8) | 6.9 | 32.5 | 0.7 |
| | 2 (3.6) | 7.3 | 43.0 | 0.7 |
| | 5 (9.1) | 7.4 | 47.0 | 0.8 |
| | 10 (18.2) | 7.3 | 47.5 | 0.8 |
| | 20 (36.4) | 7.2 | 47.0 | 0.7 |

TABLE 3-continued

|  | Amount of Mg(OH)$_2$ ( ) indicates values against polymer 100 | Initial crosslinking density ($\times 10^{-4}$ mole/cc) | Number of durably copied sheets (ten thousand sheets) | Crosslinking density of rubber deteriorated in the left tests ($\times 10^{-4}$ mole/cc) |
| --- | --- | --- | --- | --- |
| KYOWA SUIMAG | 1 (1.8) | 7.0 | 30.0 | 0.8 |
|  | 2 (3.6) | 7.1 | 40.0 | 0.7 |
|  | 5 (9.1) | 7.2 | 40.5 | 0.8 |
|  | 10 (18.2) | 7.2 | 41.0 | 0.8 |
|  | 20 (36.4) | 7.2 | 40.0 | 0.8 |

It can be seen from Table 3 that even when the initial crosslinking density is relatively high, addition of a small amount of magnesium hydroxide is markedly effective for promoting the durability, but addition of 5~10 parts of magnesium hydroxide against 100 parts of the raw rubber (9.1~18.2 parts against 100 parts of the polymer) terminates to promote the durability.

EXAMPLE 3

A silicone rubber compound was prepared according to the exactly same procedure except that the following two kinds of magnesium oxide (KYOWA MAG 100 and KYOWA MAG 150, both being produced by KYOWA KAGAKU KOGYO K.K.) were employed in place of the magnesium hydroxide used in Example 1 and were each used in amounts of 0.2, 0.5, 2.5, 5 and 10 parts. Thus, fixing rolls were prepared:

KYOWA MAG 100: magnesium oxide having a relatively high activity and an activity value (iodine adsorption amount) of 70~110 Img/MgO, and KYOWA MAG 150: magnesium oxide having a high activity and an activity value (iodine adsorption amount) of 130~170 Img/MgO.

Control fixing rolls were prepared using silicone rubber compositions obtained according to the same procedure as mentioned above except that a low-active magnesium oxide [KYOWA MAG 30: activity value (iodine adsorption amount) 30~50 Img/MgO, produced by KYOWA KAGAKU KOGYO K.K.] was used in amounts of 0.2, 0.5, 2.5, 5 and 10 parts.

In succession, the thus prepared fixing rolls and control fixing rolls were subjected to the same paper supply test as Example 1.

The obtained results are shown in Table 4.

rioration of crosslinking density, but the magnesium oxide having a high activity of 70~170 Img/MgO displays said effect conspicuously. In the fixing rolls according to the present invention, it was possible to continue paper supply almost 10~25 times as compared with the control test until the silicone rubber layer reached its durable maximum crosslinking density. In other words, the breaking speed of the crosslinking structure in the silicone rubber layer of our fixing roll was about 1/10~1/25 as compared with the control. Concerning the effect caused by the amount of the high-active magnesium oxide added, there is a tendency that addition of 0.5 parts begins to take a remarkable effect and addition of about 5 parts brings about a saturated state.

EXAMPLE 4

Fixing rolls were prepared using silicone rubber compositions obtained according to the exactly same procedure as Example 2 except that KYOWA MAG 100 and KYOWA MAG 150 used in Example 3 were employed in place of the magnesium hydroxide of Example 2 and used each in amounts of 0.2, 0.5, 2.5, 5 and 10 parts.

On the other hand, control fixing rolls were prepared using silicone rubber compositions obtained according to the same procedure as mentioned above except that KYOWA MAG 30 was used in amounts of 0.2, 0.5, 2.5, 5 and 10 parts.

In succession, the thus prepared fixing rolls and control fixing rolls were subjected to the same paper supply test as Example 1.

The obtained results are shown in Table 5. As is evident from this table, the magnesium oxide having a small iodine adsorption amount (low activity 30~50

TABLE 4

|  |  | Iodine adsorption amount (Img/MgO) | Added amount (part) | Initial crosslinking density ($\times 10^{-4}$ mole/cc) | Number of copied sheets (ten thousand sheets) when crosslinking density has reached $0.8 \times 10^{-4}$ mole/cc |
| --- | --- | --- | --- | --- | --- |
| Comparative Examples | KYOWA MAG 30 | 30–50 | 0.2 | 1.43 | 3.0 |
|  |  |  | 0.5 | 1.49 | 2.8 |
|  |  |  | 2.5 | 1.57 | 3.4 |
|  |  |  | 5 | 1.70 | 4.0 |
|  |  |  | 10 | 1.71 | 3.0 |
| Our Examples | KYOWA MAG 100 | 70–110 | 0.2 | 1.40 | 27.0 |
|  |  |  | 0.5 | 1.49 | 40.0 |
|  |  |  | 2.5 | 1.72 | 58.0 |
|  |  |  | 5 | 1.78 | 62.0 |
|  |  |  | 10 | 1.82 | 60.0 |
|  | KYOWA MAG 150 | 130–170 | 0.2 | 1.63 | 32.0 |
|  |  |  | 0.5 | 1.78 | 69.0 |
|  |  |  | 2.5 | 1.92 | 68.0 |
|  |  |  | 5 | 1.87 | 73.0 |
|  |  |  | 10 | 2.03 | 75.0 |

It can be seen from Table 4 that the magnesium oxide having a relatively low activity value, namely iodine adsorption amount, such as 30~50 Img/MgO, is not so much conspicuous in the effect for preventing the dete- Img/MgO) displays little effect, but the magnesium oxide having a high activity (70~170 Img/MgO) displays the effect that the breaking speed of the crosslinking structure is about ⅔ as compared with the case where no magnesium oxide is added. Concerning the effect caused by the amount of said magnesium oxide added, addition of 0.5 parts begins to take effect and addition of about 5 parts brings about a saturated state.

TABLE 5

|  |  | Iodine adsorption amount (Img/MgO) | Added amount (part) | Initial crosslinking density ($\times 10^{-4}$ mole/cc) | Number of copied sheets (ten thousand sheets) when crosslinking density has reached $0.8 \times 10^{-4}$ mole/cc |
|---|---|---|---|---|---|
| Comparative Examples | KYOWA MAG 30 | 30–50 | 0.2 | 6.80 | 27.0 |
|  |  |  | 0.5 | 7.30 | 31.0 |
|  |  |  | 2.5 | 7.70 | 32.5 |
|  |  |  | 5 | 7.63 | 30.0 |
|  |  |  | 10 | 7.40 | 27.5 |
| Our Examples | KYOWA MAG 100 | 70–110 | 0.2 | 6.30 | 34.0 |
|  |  |  | 0.5 | 6.90 | 45.5 |
|  |  |  | 2.5 | 7.40 | 53.0 |
|  |  |  | 5 | 7.36 | 50.5 |
|  |  |  | 10 | 7.29 | 49.0 |
|  | KYOWA MAG 150 | 130–170 | 0.2 | 7.30 | 33.0 |
|  |  |  | 0.5 | 7.40 | 48.0 |
|  |  |  | 2.5 | 7.50 | 50.0 |
|  |  |  | 5 | 7.43 | 51.5 |
|  |  |  | 10 | 7.47 | 50.0 |

EXAMPLE 5

100 parts of each methyl vinyl system silicone raw rubber having a crosslinking density of the polymer alone on crosslinking such as $1.5\times10^{-4}$, $2.0\times10^{-4}$, $3.0\times10^{-4}$ or $4.5\times10^{-4}$ mole/cc respectively, was added with 30, 50 or 80 parts of wet silica respectively to thereby obtain 12 kinds of silicone rubber compounds in total numbers.

100 parts of each of these silicone rubber compounds was added with 1 part of a crosslinking agent (RC-4) and 1 part of red iron oxide respectively, thereby preparing a silicone composition.

Then, a fixing roll was prepared using these compositions according to same procedure as Example 1 (wherein, however, the press was determined to be in the range of 120 Kg/cm²~200 Kg/cm²). This was actually set in the copying machine shown in FIG. 1 for measuring the number of durably copied sheets.

Table 6 shows the total crosslinking density on each crosslinking.

TABLE 6

| Polymer crosslinking density | Silica | | |
|---|---|---|---|
|  | 30 parts | 50 parts | 80 parts |
| $1.5 \times 10^{-4}$ | 2.55 | 4.27 | 6.09 |
| $2.0 \times 10^{-4}$ | 3.21 | 4.90 | 6.81 |
| $3.0 \times 10^{-4}$ | 4.39 | 6.52 | 8.71 |
| $4.5 \times 10^{-4}$ | 6.12 | 8.86 | 11.44 |

Figure 4:
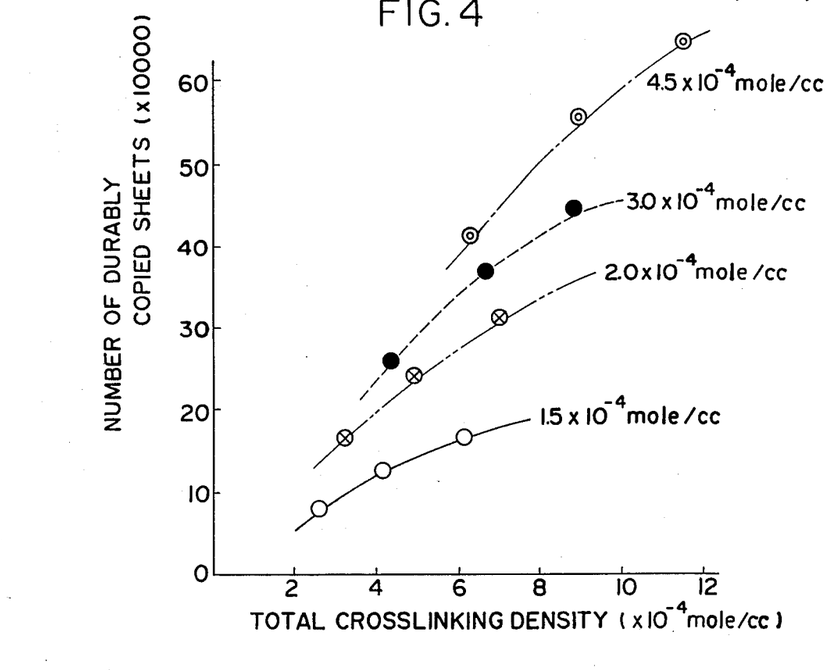
FIG. 4 is a graph showing the relation between the total crosslinking density and the number of durably copied sheets, in the case of the crosslinking density of the polymer alone being different.

FIG. 4 shows the number of durably copied sheets of each compound. It can be seen therefrom that even when the total crosslinking density is equal, differences in the crosslinking density of the polymer alone bring about wide differences in the number of durably copied sheets, and in case the polymer crosslinking density is $2.0\times10^{-4}$ mole/cc, there can be obtained a high durability such as about 300,000 sheets or more.

Method for measuring the crosslinking density of the polymer alone by the ammonia atmosphere toluene swelling method Reference will be made thereto in comparison with the aforesaid "Method for measuring the total crosslinking density by means of the toluene swelling method". This method is carried out according to the same procedure as said method for measuring the total crosslinking density except that a sample is dipped in 50 ml of toluene, then is placed in a desiccator having an ammonia atmosphere by the presence of 100 ml of a concentrated ammonia water solution (this ammonia water is changed every 24 hours) at its bottom, and the weight of the toluene-containing sample is measured at every suitable hours.

In this connection, it is to be noted that this measuring method is described in Rubber Chem. Technol., 48, 795 (1975) and J. Appl. Polym. Sci., 7,861, (1963).

EXAMPLE 6

A silicone rubber compound was obtained by adding 30 parts of a wet silica (Sipernat D-17) to 100 parts of a methyl vinyl system silicone raw rubber in which the crosslinking density of the polymer alone is $1.2\times10^{-4}$, $2.15\times10^{-4}$ or $3.2\times10^{\times 4}$ mole/cc respectively on crosslinking.

A fixing roll was prepared using this silicone rubber compound according to the same procedure as Example 5.

Figure 5:
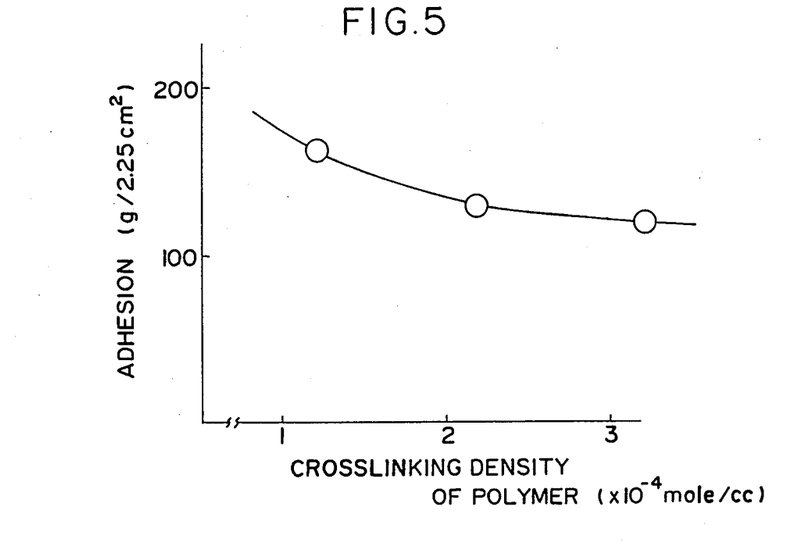
FIG. 5 is a graph showing the relation between the crosslinking density of the polymer and the adhesion.

This fixing roll was subjected to the adhesion test referred to hereinafter for valuing its releasing property. The results were as shown in FIG. 5. Herein, the adhesive strength is serviceable for setting up a standard frequency of hot offset of a toner, winding of paper around a fixing roll and the like. It is judged that the smaller this value, the less its frequency is. Viewed from the application to an actual machine, the adhesive strength of 250 g/2.25 cm² or less is regarded as causing no problems when used actually in the copying machine.

It can be seen from FIG. 5 that the higher the crosslinking density of the polymer alone is, the more the adhesive strength deteriorates and the releasing property is improved.

Method for measuring the adhesive strength

A rubber sheet of 15 millimeters square ×2 mm thickness was put on a sheath heater. On the other hand, a paper was fixed on another sheath heater, and a toner comprising a molten, milled powder having the following composition was placed on said paper in an amount of $5 \times 10^{-3}$ g/cm². The surface temperature of the rubber sheet and the temperature of said toner were heated to 120° C. by means of the sheath heater respectively. Thereafter, the rubber sheet was thrust on the toner surface for 2 minutes under the pressure of about 3 Kg/15 mm×15 mm. In succession, the rubber sheet was separated apart at the speed of 40 mm/minute. The maximum value of the force exerted between the rubber sheet and the toner was named the adhesive strength (g/2.25 cm²) to the toner.

The toner composition is as shown below:

| | |
|---|---|
| unsaturated polyester resin | 100 parts |
| styrene-(n-butyl methacrylate) resin | 20 parts |
| carbon black | 45 parts |

EXAMPLE 7

Prior to the preparation of a fixing roll, a core bar-roll and, a thermal conductive silicone compound and a non-adhesive silicone rubber were prepared respectively as mentioned below.

Core bar-roll

The surface of an aluminum roll (outer diameter: 51.4 mm$\phi$) was roughened using a sand blast, and said surface was coated with a primer (XP82-002 produced by TOSHIBA SILICONE K. K.) and air dried.

Heat conductive silicone compound (Compound A):

7 kinds of blended compounds were prepared by kneading a thermal conductivity increasing agent (Graphite AP produced by NIHON KOKUEN KOGYO K. K.) in amounts of 0, 20, 40, 60, 80, 100 and 250 parts together with a base mixture comprising 100 parts of a silicone rubber compound KE530 $\mu$ (produced by SHINETSU KAGAKU KOGYO K. K.), 1 part of a coloring pigment paste KE color BR (produced by SHINETSU KAGAKU KOGYO K. K.) and 2 parts of a crosslinking agent C-6 (produced by SHINETSU KAGAKU KOGYO K. K.) respectively.

Non-adhesive silicone compound (Compound B):

3 kinds of blended compounds were prepared by mixing and kneading 1 part of a coloring pigment paste CP-21 and/part of a crosslinking agent RC-4 respectively together with rubber compounds comprising adding a wet silica to 100 parts of each of 3 kinds of methyl vinyl system silicone rubbers which are different in the vinyl group contents.

First, said 7 kinds of compounds A were wound round said core rods under the same conditions, and same was vulcanized under the same conditions as Example 1 and then finished using a grinder so as to have a roll outer diameter of 59.4 mm.

Figure 6:
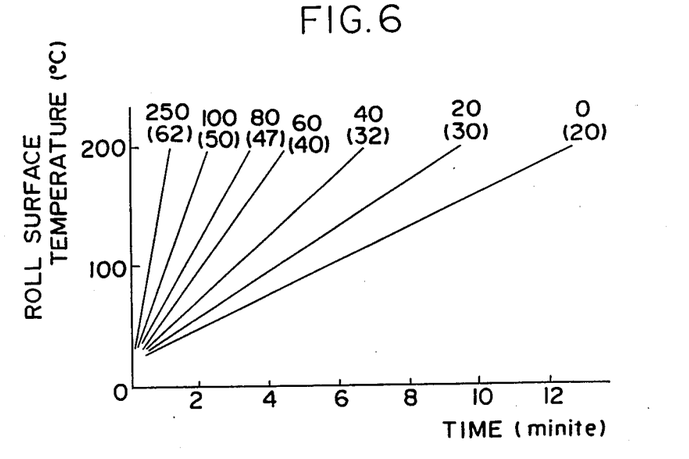
FIG. 6 is a graph measuring the ascending velocity of the surface temperature of the roll when taking the amounts of graphite contained in the thermal conductive silicone compound into consideration.

A 100 V-900 W infrared heater was attached to the central part of the core rod of the thus prepared roll and driven at the speed of 3 rotations/second to thereby measure the rising speed of the roll surface temperature with the amount of Graphite AP as the parameter. Sheet-like rubbers were also prepared under the like vulcanizing conditions, and the hardness of each rubber was measured These results are as shown in FIG. 6. In this figure, the bracketed value denotes the hardness of rubber.

The thermal conductivity of the fixing roll and the hardness of rubber are set on the basis of the fixing speed of the fixing apparatus, the waiting time from switch on to start of copying, the amount of electric power to be consumed, and the like. In this instance, the amount of Graphite AP was determined to be 60 parts taking these factors into consideration.

On the other hand, the aforesaid 3 kinds of compounds B were applied on said core rod under the same conditions as Example 1 to form a silicone rubber layer. A fixing roll having an outer diameter of 52 mm was thus prepared. This roll was practically set in the copying machine shown in FIG. 1 for the purpose of measuring the durability of copies.

Figure 7:
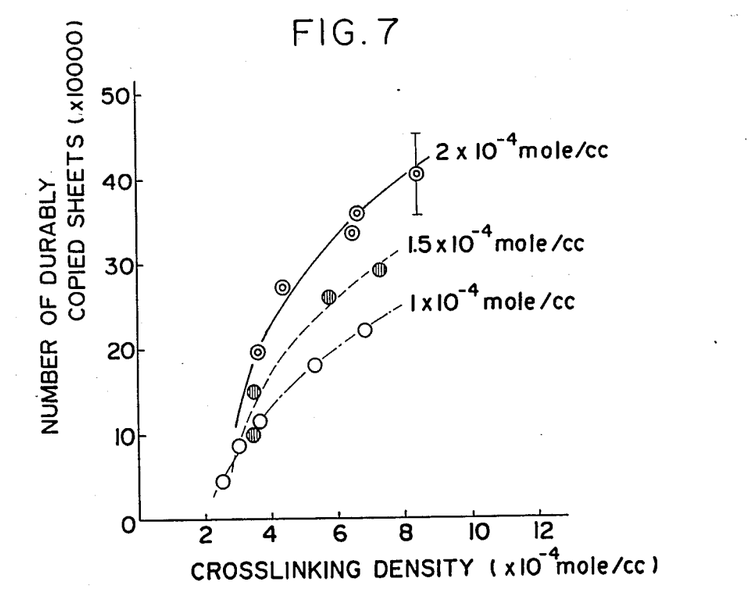
FIG. 7 is a graph showing the crosslinking density and the number of durably copied sheets in the case of changing the amounts of silica added in the non-adhesive silicone compound.

In this instance, the above mentioned 3 kinds of raw rubbers were vulcanized according to the same conditions except that the wet silica was not added to thereby find out the crosslinking density derived from a vinyl group. This value was employed as a parameter. The crosslinking density of silicone rubber was changed by changing the amount of wet silica added respectively. Thus, the relation between the crosslinking density and the number of durably copied sheets was obtained. The obtained results are as shown in FIG. 7. Hereupon, the crosslinking density was measured by means of the toluene swelling method. And, the number of durably copied sheets was determined by the method for valuing the durability (II) referred to afterwards.

It can be seen from FIG. 7 that a superior durability can be obtained by setting the crosslinking density to be $6 \times 10^{-4}$ mole/cc or more. When the crosslinking density derived from the vinyl group is increased, the durability is elevated. When the crosslinking density is $2 \times 10^{-4}$ mole/cc or more, the durability of 300,000 sheets or more can be obtained.

In succession, a blended compound was prepared by blending the following components:

| | |
|---|---|
| a methyl vinyl system silicone raw rubber (pulverized with a vinyl group alone and having the crosslinking density of $2 \times 10^{-4}$ mole/cc) | 55 parts |
| a wet silica (Sipernat D-17) | 30 parts |
| Diatomaceous earth (Radiolite #200 produced by SHOWA KAGAKU K. K.) | 15 parts |
| a coloring pigment paste (CP-21) | 1 part |
| a crosslinking agent (RC-4) | 1 part |

This compound was wound around the surface of a roll (roll diameter: 59.4 mm) comprising coating the surface of said core rod with a thermal conductive elastomer (containing 60 parts of graphite) so as to have a thickness of 1 mm. Same was subjected to press vulcanization, and thereafter was finished by means of a grinder so as to have an outer diameter of 60.0 mm. The crosslinking density of this nonadhesive silicone elastomer after vulcanization was found to be $7.1 \times 10^{-4}$ mole/cc.

The thus obtained fixing roll according to the embodiment (iv) of the present invention was found to have the number of durably copied sheets of 800,000 sheets.

The reason why the number of durably copied sheets has increased thus markedly is considered to consist in that when using the fixing roll according to the embodiment (iv) of the present invention which comprises providing the specific coated layer on the thermal conductive elastic body layer, the surface of the fixing roll is prevented from being damaged by the separating scrapper disposed adjacent thereto to the utmost.

Method for valuing the durability (II)

As the pressure roll 16 there was employed the one comprising forming about 150 μm-thick layer of perfluoroalkoxy resin on the surface of an aluminum core rod and having an outer diameter of 60 mm. A twill-figured image, wherein 8% of the total area of said image was black, was continuously formed on B4-sized papers by longitudinal feed (32 sheets/minute) by using polydimethylsiloxane as the releasing agent and under the conditions: the linear velocity of the fixing roll 280 mm/second and the surface temperature of the fixing roll 180±5° C., and the time when either one of the abnormal copies (non-fixed portion, toner offset, unbalanced luster of the black solid area and the like) caused by the fixing roll came into existance on the copied image and the time when the copying paper is caught at the separating nail portion were established the limit of durability.

What is claimed is:

1. In a fixing roll for electrophotography comprising a metal core and a silicone rubber surface layer, the improvement which comprises:
said silicone rubber surface layer is a heat-cured, crosslinked, silicone rubber composition prepared by incorporating a crosslinking agent into a blend consisting essentially of silica, a polysiloxane polymer consisting essentially of recurring units of the formulas and a material selected from the group consisting of magnesium hydroxide and highly active magnesium oxide, and heating said blend to a crosslinking temperature effective to convert said blend to said heat-cured, crosslinked, silicone rubber composition.

2. A fixing roll as claimed in claim 1 in which said silicone rubber surface layer is a heat-cured, crosslinked, silicone rubber composition having a crosslinking density of from $1.5 \times 10^{31\ 4}$ mole/cc to $2.5 \times 10^{-4}$ mole/cc measured by the toluene swelling method, said silicone rubber composition having been prepared by incorporating a peroxide crosslinking agent into a blend consisting essentially of from 30 to 60 wt. % silica, a polysiloxane polymer consisting essentially of recurring units of the formulas and a material selected from the group consisting of (a) from 1.4 to 10 parts by weight of magnesium hydroxide per 100 parts by weight of said polysiloxane polymer, and (b) from 0.3 to 14 parts by weight of highly active magnesium oxide per 100 parts by weight of said polysiloxane polymer, said highly active magnesium oxide having an iodine adsorption amount of from 70 to 170 mg I/g of magnesium oxide, and heating said blend to a crosslinking temperature effective to convert said blend to said heat-cured, crosslinked silicone rubber composition.

3. A fixing according to claim 1, wherein the crosslinking density of said silicone rubber is in the range of $1 \times 10^{-4} \sim 8 \times 10^{-4}$ mole/cc measured by the toluene swelling method.

4. A fixing roll according to claim 1, wherein the crosslinking density of said silicone rubber is in the range of $1.5 \times 10^{-4} \sim 2.5 \times 10^{-4}$ mole/cc measured by the toluene swelling method.

5. A fixing roll according to claim 1, wherein said silica is prepared by a wet process.

6. A fixing roll according to claim 1, wherein said silica comprises 30~60 wt % of said silicone rubber layer.

7. A fixing roll according to claim 1, wherein said magnesium hydroxide is contained in an amount of 1.4~10.0 parts by weight to 100 parts by weight of said polysiloxane polymer.

8. A fixing roll according to claim 1, wherein said magnesium hydroxide has an iodine adsorption amount of 7018 170 Img/MgO.

9. A fixing roll according to claim 1, wherein said magnesium oxide is contained in an amount of 0.3~14.0 parts by weight to 100 parts by weight of said polysiloxane polymer.

10. In a fixing roll for electrophotography comprising a metal core and a silicone rubber surface layer, the improvement which comprises:
said silicone rubber surface layer is a heat-cured, crosslinked, silicone rubber composition prepared by incorporating a crosslinking agent into a blend consisting essentially of silica and a polysiloxane polymer consisting essentially of recurring units of the formulas and heating said blend to a crosslinking temperature effective to convert said blend to said heat-cured, crosslinked, silicone rubber composition, the crosslinking density of said polysiloxane polymer alone being $2 \times 10^{-4}$ mole/cc or higher, measured by the ammonia atmosphere toluene swelling method.

11. A fixing roll according to claim 10, wherein the crosslinking density of said polysiloxane polymer alone at the time of said crosslinking is $2 \times 10^{-4} \sim 5 \times 10^{-5}$ mole/cc.

12. A fixing roll according to claim 10, wherein said silica is prepared by a wet process.

13. A fixing roll according to claim 10, wherein said silica comprises 20~50 wt % of said silicone rubber layer.

14. A fixing roll for electrophotography comprising a metal core, a relatively thick thermally conductive elastic layer coated on and covering said metal core and a relatively thin silicone rubber surface layer coated on and covering said thermally conductive elastic layer,
said silicone rubber surface layer being a heat-cured, crosslinked, silicone rubber composition having a crosslinking density of at least $6 \times 10^{-4}$ mole/cc measured by the toluene swelling method, said silicone rubber composition having been prepared by incorporating a crosslinking agent into a blend consisting essentially of silica and a polysiloxane polymer consisting essentially of recurring units of the formulas and heating said blend to a crosslinking temperature effective to convert said blend to said heat-cured, crosslinked, silicone rubber composition.

15. A fixing roll according to claim 14, wherein said thermal conductive elastic layer is a mixture of a thermal conductivity improving agent and a thermo-setting or room temperature-setting silicone rubber elastomer.

16. A fixing roll according to claim 15, wherein the amount of said thermal conductivity improving agent added is 20~250 parts by weight per 100 parts by weight of said elastomer.

17. A fixing roll according to claim 16, wherein said thermal conductivity improving agent is powders of graphite, metal, iron oxide, zinc oxide selected from the group consisting of and boron nitride.

18. A fixing roll according to claim 14 wherein said crosslinking density is $6 \times 10^{-4} \sim \times 10^{-4}$ mole/cc.

19. A fixing roll according to claim 14, wherein said silica is prepared by a wet process.

20. A fixing roll according to claim 14, wherein said silica comprises 30~60 wt % of said silicone surface rubber surface layer.

* * * * *

UNITED STATES PATENT AND TRADEMARK OFFICE
CERTIFICATE OF CORRECTION

PATENT NO. : 4 702 964

DATED : October 27, 1987

INVENTOR(S) : Yasuo HIRANO et al

It is certified that error appears in the above-identified patent and that said Letters Patent is hereby corrected as shown below:

Column 17, lines 31-35;
          lines 55-59;
Column 18, lines 39-43; and
Column 19, lines 8-13; separate the formulas to read as follows:

Column 17, line 46; change "1.5 x $10^{31}$ 4" to --- 1.5 x $10^{-4}$ ---.

Column 18, line 4; after "fixing" insert ---roll---.

Column 18, line 10; change "1.5 x $10^{-4} \sim 2.5$ x $10^{-4}$" to ---1.5 x $10^{-4} \sim 2.5$ x $10^{-4}$---.

UNITED STATES PATENT AND TRADEMARK OFFICE
CERTIFICATE OF CORRECTION

PATENT NO. : 4,702,964

DATED : October 27, 1987

INVENTOR(S) : Yasuo HIRANO et al

It is certified that error appears in the above-identified patent and that said Letters Patent is hereby corrected as shown below:

Column 18, line 23; change "7018 170 Img/MgO" to
---70 $\sim$ 170 Img/MgO---.

Column 20, line 8; after "is" insert ---selected from the group consisting of---.

line 9; delete "selected from the".

line 10; delete "group consisting of".

line 12; change "6 x $10^{-4}$ $\sim$ x $10^{-4}$" to
--- 6 x $10^{-4}$ $\sim$ 8 x $10^{-4}$ ---.

line 16; after "silicone" delete "surface".

Signed and Sealed this

Twelfth Day of April, 1988

*Attest:*

DONALD J. QUIGG

*Attesting Officer*  *Commissioner of Patents and Trademarks*